United States Patent [19]

Genz et al.

[11] Patent Number: 4,970,286
[45] Date of Patent: Nov. 13, 1990

[54] THERMOTROPIC, FULLY AROMATIC POLYESTERS HAVING A LOW PROCESSING TEMPERATURE, A PROCESS FOR THEIR PRODUCTION AND THEIR USE FOR THE PRODUCTION OF MOLDINGS, FILAMENTS, FIBERS AND FILMS

[75] Inventors: Joachim Genz; Volker Eckhardt; Karsten-Josef Idel, all of Krefeld; Carl Casser, Bonn, all of Fed. Rep. of Germany

[73] Assignee: Bayer Aktiengesellschaft, Leverkusen, Fed. Rep. of Germany

[21] Appl. No.: 370,751

[22] Filed: Jun. 23, 1989

[30] Foreign Application Priority Data

Jul. 5, 1988 [DE] Fed. Rep. of Germany ....... 3822666

[51] Int. Cl.$^5$ .................... C08G 63/02; C08G 63/00; C08G 63/18
[52] U.S. Cl. .................... 528/193; 528/176; 528/194; 528/271; 528/272; 528/480; 528/481
[58] Field of Search ............... 528/176, 193, 194, 271, 528/272, 480, 481

[56] References Cited

U.S. PATENT DOCUMENTS 4,108,835 8/1978 Arnold et al. ................ 528/183
4,154,922 5/1979 Donohue ..................... 528/183
4,861,857 8/1989 Kricheldorf et al. ........... 528/193

Primary Examiner—Harold D. Anderson
Assistant Examiner—T. Mosley
Attorney, Agent, or Firm—Connolly and Hutz

[57] ABSTRACT

Thermotropic polyesters containing recurring structural units corresponding to the following formulae

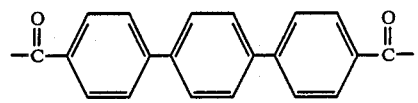

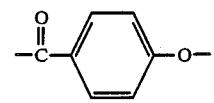

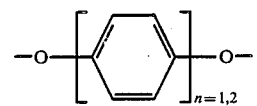

and

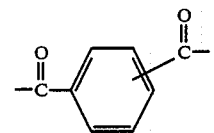

can be processed at low temperatures and may be used for the production of moldings, filaments, fibers and films.

8 Claims, No Drawings

THERMOTROPIC, FULLY AROMATIC POLYESTERS HAVING A LOW PROCESSING TEMPERATURE, A PROCESS FOR THEIR PRODUCTION AND THEIR USE FOR THE PRODUCTION OF MOLDINGS, FILAMENTS, FIBERS AND FILMS

This invention relates to high molecular weight, fully aromatic thermotropic polyesters having a low processing temperature, to a process for their production and to their use for the production of moldings, filaments, fibers and films.

"Thermotropic" substances are substances which form liquid crystalline melts. Thermotropic polyesters are already known. A summary of relevant literature can be found, for example, in German patent application P 37 37 067, in DE-OS 33 25 787 and in EP-OS 134 959 where a method for investigating the liquid crystalline state of polymer melts is also described.

Moldings produced from liquid crystalline melts of fully aromatic polycondensates show strength and rigidity values which are normally not found in non-reinforced polycondensates processed from isotropic melts. Polymers leading to rigid, rodlet-like macromolecules or macromolecule segments are normally used for the synthesis of thermotropic polycondensates. For example, liquid crystalline polyesters consisting of p-hydroxy benzoic acid, 4,4,'-dihydroxy diphenyl and terephthalic acid have been described (cf. for example DE-OS 2 025 971), as have liquid crystalline polyesters of 2-hydroxy-6-naphthoic acid and p-hydroxy benzoic acid (cf. for example EP 22 344) and liquid crystalline polyesters of p-hydroxy benzoic acid, 2,6-dihydroxy naphthalene and terephthalic acid (cf. for example EP 1 340). Polyesters of this type can be processed as thermoplastics. However, they are normally attended by the disadvantage that their processing temperature is relatively high, i.e. above 350° C.

Accordingly, the object of the present invention is to provide thermoplastic, liquid crystalline polycondensates which have a low softening temperature, i.e. can be processed from liquid crystalline melts at low temperatures.

It has now surprisingly been found that fully aromatic polyesters containing co-condensed residues of 4,4"-p-terphenyl dicarboxylic acid, aromatic hydroxy carboxylic acids, aromatic dihydroxy compounds and, optionally, other aromatic dicarboxylic acids show the advantageous property required.

Accordingly, the present invention relates to fully aromatic thermotropic polyesters containing recurring structural units corresponding to the following formulae

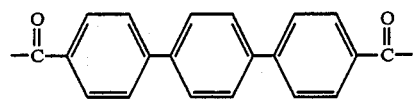

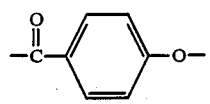

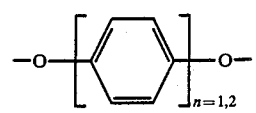

and

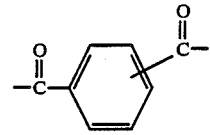

containing the co-condensed residues (I) in a quantity of from 1 to 50 mol-%, preferably in a quantity of from 5 to 45 mol-% and, more preferably, in a quantity of from 10 to 40 mol-%, most preferably in a quantity of from 15 to 40 mol-% and (II) in a quantity of from 40 to 75 mol-%, preferably in a quantity of from 50 to 75 mol-% and, more preferably, in a quantity of from 60 to 75 mol-%, based on the sum of the co-condensed residues (I), (II), (III) and (IV), with a molar ratio of the co-condensed residues (III)/(I)+(IV) of from 0.95 to 1.05 and a value for n of 1 or 2.

The structural unit (I) is derived from 4,4"-p-terphenyl dicarboxylic acid or reactive derivatives thereof, such as the aryl esters.

The structural unit (II) is derived from p-hydroxy benzoic acid or reactive derivatives thereof, such as the aryl esters or acyl esters.

The structural unit (III) is derived from hydroquinone and/or 4,4,'-dihydroxy diphenyl or reactive derivatives thereof, such as the acyl esters.

The structural unit (IV) is derived from terephthalic acid and/or isophthalic acid or reactive derivatives thereof, such as the aryl esters.

The polyesters according to the invention may contain the units of the residues (II), of the residues (I)+(III) or of the residues (III)+(IV) in statistical distribution or in blocks. However, it should be noted that relatively long blocks of these units can greatly increase the melt viscosity and melting point of the resulting polymers.

The polyesters according to the invention may optionally be modified by angled or flexible bisphenols, such as resorcinol and/or bisphenol A, in a concentration of up to 10 mol-% and preferably in a concentration of from 1 to 8 mol-%.

The polyesters according to the invention may be terminated by -COOH, -H, -OH, -OC$_6$H$_5$, acyloxy groups or by residues of molecular weight regulators (chain terminators).

Preferred chain terminators are monofunctional aromatic hydroxyl compounds, such as 4-hydroxy diphenyl, p-nonyl phenol, 4-(1,1,3,3-tetramethylbutyl)-phenol, β-naphthol, and aromatic monocarboxylic acids, such as diphenyl carboxylic acids and naphthalene carboxylic acids. The chain terminators may be used in quantities of from about 0.1 to 10 mol-% and preferably in quantities of from 0.5 to 5 mol-%, based on the sum of the residues I, II and IV in the case of carboxylic acids and on the residues I, II and III in the case of phenols.

It is also possible to use branching trifunctional or higher, preferably aromatic, monomers, such as phloroglucinol, 1,3,5-benzene tricarboxylic acid and/or 3,5-dihydroxy benzoic acid, based on the sum of the residues I, II and III.

The polyesters according to the invention are insoluble in the solvents tested by Applicants, such as p-chlorophenol or phenol/1,1,2,2-tetrachloroethane (ratio by weight 1:1).

The polyesters according to the invention preferably have a melt viscosity of less than 1000 Pa.s and preferably in the range from 10 to 500 Pa.s, as measured at a shear rate of $10^3 sec^{-1}$ using a nozzle having a length-to-diameter ratio of 20 at a temperature below 330° C. (280° to 330° C).

The polyesters according to the invention may be produced by various methods, for example by condensation or transesterification of the hydroxy carboxylic acids derived from the residues I, II, III and IV, diphenols and dicarboxylic acids or reactive derivatives thereof and subsequent polycondensation (cf. R. W. Lenz, "Synthetic routes to liquid crystalline polymers" in: Recent Advances in Liquid Crystalline Polymers, Elseview, N.Y., 1985).

Examples of preferred starting compounds are their aryl esters and their acyl esters.

In one preferred synthesis, the lower acyl esters, preferably the acetates, of the hydroxy carboxylic acids derived from the residues (I) and (II) and of the diphenols derived from the residues (III) are reacted with dicarboxylic acids derived from the residues (IV); the acyl esters may also be prepared in situ.

These reactions may be carried out in the melt phase. However, the reaction may also be carried out in the presence of a liquid heat-transfer medium of high boiling point (cf. DE-OS 20 25 971).

The residues (I), (II), (III) and (IV) are incorporated in the polyester in the ratio of the starting components.

It may be advisable catalytically to accelerate both the condensation or transesterification reactions and the polycondensation reactions. Suitable catalysts are known and include for example Lewis acids and hydrohalic acids; oxides, hydrides, hydroxides, halides, alcoholates, phenolates, salts of inorganic or organic acids (preferably carboxylic acid salts), complex salts or mixed salts of the alkaline earth metals, such as magnesium, calcium; of the secondary group elements, such as vanadium, titanium, manganese, cobalt, nickel, zinc, lanthanum, cerium, zirconium or of elements of other groups of the periodic system such as germanium, tin, lead and antimony or even the alkali metals or alkaline earth metals themselves. Particularly suitable catalysts are sodium, sodium hydroxide, lithium acetate, sodium acetate, calcium acetate, magnesium acetate, cobalt acetate, zinc acetate, calcium benzoate, magnesium acetyl acetonate, zinc acetonate, vanadyl-$C_1$-$C_8$-alkoxides, titanium alkoxides, such as titanium tetrabutylate, tetrapropylate, alkoxy titanium silicates, zirconium butylate, zirconium propylate, titanium tetraphenylate, sodium phenylate, germanium dioxide, antimony trioxide, dialkyl and diaryl tin oxide, dibutyl tin diacetate, dibutyl dimethoxy tin.

The quantities of catalyst used are preferably from about 0.001 to 1% by weight and more preferably from 0.01 to 0.2% by weight, based on the total weight of the monomers used.

The polyesters according to the invention may be produced at temperatures in the range from about 150° to 380° C., the reaction generally being started at low temperatures and the temperature being continuously increased as the reaction progresses. As the reaction velocity diminishes, a vacuum may be applied, the pressure preferably being reduced continuously from normal pressure to around 0.1 mbar.

The product obtained may be subjected in granulate or powder form to solid-phase post-condensation under reduced pressure at temperatures in the range from about 150° to 300° C. and preferably in the range from 200° to 250° C. After 1 to 25 hours, the molecular weight has increased and the resulting properties of the polyester have notably improved.

Accordingly, the present invention also relates to a process for the production of the new polyesters by reaction of the dicarboxylic acid derived from the residue (I) with the hydroxy carboxylic acid derived from the residue (II) and with the diphenol derived from the residue (III) or reactive derivatives thereof, which may be formed in situ, and with the dicarboxylic acid derived from the residue (IV), optionally in the presence of catalysts, chain terminators and branching agents, at temperatures in the range from 150° to 380° C. and optionally under reduced pressure.

By virtue of their relatively low melt viscosity, the thermotropic polyesters according to the invention may advantageously be processed from the melt to form injection-molded articles, filaments, fibers, tapes and films, the shear forces involved producing a molecular orientation which is influenced to a large extent by the strength of the shear forces. In addition, they show pronounced pseudoplasticity, i.e. their melt viscosity decreases considerably with increasing shear forces. Suitable processing methods include injection molding, extrusion, pultrusion, molding, thermoforming and melt spinning.

Moldings of high strength and rigidity, high toughness, particularly at low temperatures, high elongation and break and high dimensional stability can be produced from the polyesters according to the invention. Since, in addition, the polyesters show high resistance to chemicals and high flame resistance, they are particularly suitable for the production of encapsulations for light-wave guides, electrical articles, such as insulators, printed circuit boards, plugs, encapsulations for integrated circuits, armature parts, parts of chemical engineering plant, such as pipes, vessel linings, rotors, sliding bearings, seals, packings, parts of medical equipment; components of air conditioning plants and also valve components.

However, the polyesters according to the invention may also be used as coating materials (in powder form or in dispersed form). They are also eminently suitable for the production of reinforced or filled molding compounds having a reinforcing material and/or filler content of 5 to 65% by weight, based on the reinforced and/or filled molding compounds. Suitable reinforcing materials and fillers are known and are described, for example, in DE-OS 3 118 526. Preferred reinforcing materials are glass fibers while preferred fillers, which may also have a reinforcing effect, are glass beads, mica, silicates, quartz, talcum, titanium dioxide and wollastonite.

Accordingly, the present invention also relates to the use of the polyesters for the production of moldings, filaments, fibers and films. The present invention also relates to molding compounds based on the polyesters according to the invention containing from 5 to 65% by weight, based on the reinforced and/or filled molding compound, of a reinforcing material and/or filler.

EXAMPLES

The investigation of thermotropic liquid crystalline behavior was carried out by the method described in DE-OS 33 25 787. The softening temperature was determined on a heating stage microscope (Reichert, Austria). The softening temperature was the temperature at which the sample had completely melted and formed a readily movable melt.

COMPARISON EXAMPLE 1

Production of a thermotropic, fully aromatic polyester from p-hydroxy benzoic acid, terephthalic acid and hydroquinone The following substances were weighed into a 1-liter three-necked round-bottomed flask equipped with a stirrer, distillation column and nitrogen inlet:
- 83.4 g=0.604 mol p-hydroxy benzoic acid
- 49.5 g=0.298 mol terephthalic acid
- 32.8 g=0.298 mol hydroquinone
- 128.6 g=1.26 mol acetanhydride
- 75 mg=80 ppm germanium dioxide
- 75 mg=80 ppm hydroquinone sulfonic acid potassium salt After repeated evacuation and purging with nitrogen, the apparatus was heated to 170° C. over a period of 30 minutes. The temperature was increased in steps to 320° C. over a period of another 4 hours. At that temperature, a vacuum was applied and the pressure was continuously reduced to 0.8 mbar. After 25 minutes under that vacuum, the heating bath was removed and the product was isolated after cooling by breaking the flask. A light beige polyester was obtained. This product was insoluble in the test solvents, such as p-chlorophenol or phenol/1,1,2,2-tetrachloroethane (ratio by weight 1:1).

The softening temperature was determined by the method described above. The resulting polyester was infusable up to 400° C.

EXAMPLE 2

Production of a polyester according to the invention of 4,4''-p-terphenyl dicarboxylic acid, p-hydroxy benzoic acid, terephthalic acid and hydroquinone The following substances were weighed into a 1-liter three-necked round-bottomed flask equipped with a stirrer, distillation column and nitrogen inlet:
- 47.3 g=1.49 mol 4,4''-p-terphenyl dicarboxylic acid
- 83.4 g=0.604 mol p-hydroxy benzoic acid
- 24.7 g=0.149 mol terephthalic acid
- 32.8 g=0.298 mol hydroquinone
- 128.6 g=1.26 mol acetanhydride
- 75 mg=80 ppm germanium dioxide
- 75 mg=80 ppm hydroquinone sulfonic acid potassium salt After repeated evacuation and purging with nitrogen, the apparatus was heated to 170° C. over a period of 30 minutes. The temperature was increased in steps to 320° C. over a period of another 4 hours. At that temperature, a vacuum was applied and the pressure was continuously reduced to 0.8 mbar. After 25 minutes under that vacuum, the heating bath was removed and the product was isolated after cooling by breaking the flask. A light beige fibrous polyester was obtained. This product was insoluble in the test solvents, such as p-chlorophenol or phenol/1,1,2,2-tetrachloroethane (ratio by weight 1:1).

The softening temperature was determined by the method described above. It was 289° C.

Comparison Example 3

The following substances were reacted in the same way and in the same apparatus as described in Comparison Example 1:
- 104.3 g=0.756 mol p-hydroxy benzoic acid
- 61.8 g=0.372 mol terephthalic acid
- 69.3 g=0.372 mol 4,4,'-dihydroxy diphenyl
- 128.6 g=1.26 mol acetanhydride
- 75 mg=80 ppm germanium dioxide
- 75 mg=80 ppm hydroquinone sulfonic acid potassium salt The softening point of the resulting, thermotropic polyester was 375° C.

Examples 4–17

Further polyesters were produced in the same way and in the same apparatus as described in Example 2. The composition of the products and the softening temperatures determined are shown in the following Table:

| Ex. No. | pHB* Mol % | TDC* Mol % | TS* Mol % | IS* Mol % | HY* Mol % | DOD* Mol % | SP** °C. |
|---|---|---|---|---|---|---|---|
| 4 | 67 | 27 | 6 | — | 33 | — | 210 |
| 5 | 67 | 33 | — | — | 33 | — | 180 |
| 6 | 67 | 16.5 | 16.5 | — | — | 33 | 211 |
| 7 | 67 | 27 | 6 | — | — | 33 | 211 |
| 8 | 67 | 33 | — | — | — | 33 | 195 |
| 9 | 67 | 16.5 | 16.5 | — | 11 | 22 | 208 |
| 10 | 67 | 16.5 | 16.5 | — | 16.5 | 16.5 | 203 |
| 11 | 67 | 22 | 11 | — | 22 | 11 | 247 |
| 12 | 75 | 20 | — | 5 | — | 25 | 228 |
| 13 | 75 | 25 | — | — | — | 25 | 215 |
| 14 | 75 | 20 | — | 5 | 25 | — | 230 |
| 15 | 75 | 25 | — | — | 25 | — | 109 |
| 16 | 75 | 20 | — | 5 | 12.5 | 12.5 | 203 |
| 17 | 75 | 25 | — | — | 12.5 | 12.5 | 196 |

*pHB = p-hydroxy benzoic acid
TDC = 4,4''-p-terphenyl dicarboxylic acid
TS = terephthalic acid
IS = isophthalic acid
HY = hydroquinone
DOD = 4,4'-dihydroxy diphenyl
**SP = softening temperature determined by the method described above.

What is claimed is:

1. Thermotropic, fully aromatic polyester containing recurring structural units corresponding to the following formulae:

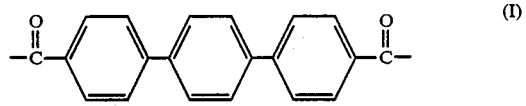 (I)

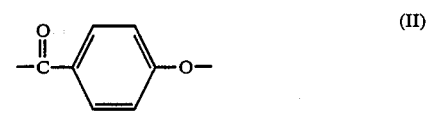 (II)

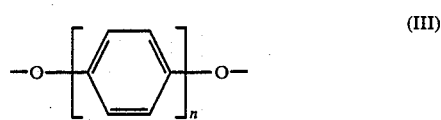 (III)

and

-continued

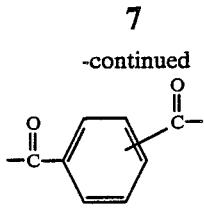
(IV)

containing the units
(I) in the quantity of from 1 to 50 mol-%, and
(II) in a quantity of from 40 to 75 mol-%, based on the sum of the units (I) to (IV) with a molar ratio of units (III)/(I)+(IV) of 0.95 to 1.05, and wherein n is 1 or 2.

2. Polyester as claimed in claim 1 containing the units (I) in a quantity of from 5 to 45 mol-%, based on the sum of units (I) to (IV).

3. Polyester as claimed in claim 1 containing the units (I) in a quantity of from 10 to 40 mol-%, based on the sum of units (I) to (IV).

4. Polyester as claimed in claim 1 containing the units (III) in a quantity of from 60 to 75 mol-%, based on the sum of units (I) to (IV).

5. A process for producing thermotropic, fully aromatic polyester, comprising reacting:
(1) a first reactant consisting of 4,4''-p-terphenyl dicarboxylic acid or an aryl ester derivative thereof;
(2) a second reactant consisting of p-hydroxybenzoic acid or an acyl ester or aryl ester derivative thereof;
(3) a third reactant selected from hydroquinone, 4,4'-dihydroxy diphenyl or its acyl ester derivatives, or mixtures thereof; and
(4) a fourth reactant selected from therephthalic acid, isophthalic acid or its aryl ester derivatives, or mixtures thereof at temperatures between 150° and 380° C., optionally in the presence of catalysts, chain terminators, or branching agents, and optionally under reduced pressure.

6. A process as claimed in claim 5, wherein the reaction is followed by solid-phase post-condensation.

7. A molding filament, fiber or film of the polyester of claim 1.

8. A molding composition comprising the polyester of claim 1 and 5 to 65% by weight of a reinforcing material or filler based on the composition weight.

* * * * *